United States Patent
Raja et al.

(10) Patent No.: US 12,427,491 B2
(45) Date of Patent: Sep. 30, 2025

(54) GAS DISTRIBUTOR FOR BUBBLE COLUMN REACTOR

(71) Applicant: HINDUSTAN PETROLEUM CORPORATION LIMITED, Bengaluru (IN)

(72) Inventors: Kanuparthy Naga Raja, Bengaluru (IN); Ramachandra Rao Bojja, Bengaluru (IN); Bhavesh Sharma, Bengaluru (IN)

(*) Notice: Subject to any disclaimer, the term of this patent is extended or adjusted under 35 U.S.C. 154(b) by 542 days.

(21) Appl. No.: 17/799,226

(22) PCT Filed: Feb. 12, 2021

(86) PCT No.: PCT/IN2021/050137
§ 371 (c)(1),
(2) Date: Aug. 11, 2022

(87) PCT Pub. No.: WO2021/161343
PCT Pub. Date: Aug. 19, 2021

(65) Prior Publication Data
US 2023/0356166 A1    Nov. 9, 2023

(30) Foreign Application Priority Data
Feb. 12, 2020   (IN) .............................. 202021006164

(51) Int. Cl.
*B01J 8/00* (2006.01)
*B01J 4/00* (2006.01)
(Continued)

(52) U.S. Cl.
CPC .............. *B01J 8/22* (2013.01); *B01J 8/1872* (2013.01); *B01J 2208/00902* (2013.01); *B01J 2208/00938* (2013.01)

(58) Field of Classification Search
CPC .. B01J 8/22; B01J 8/1872; B01J 2208/00902; B01J 2208/00938; B01J 2208/00911;
(Continued)

(56) References Cited

U.S. PATENT DOCUMENTS

2007/0196249 A1   8/2007   Fridman et al.
2016/0167007 A9   6/2016   Korsten et al.

FOREIGN PATENT DOCUMENTS

| CN | 105944630 B | 4/2019 | |
| CN | 208883870 U | * 5/2019 | ............ C12M 29/06 |
| WO | 2021/161343 A1 | 8/2021 | |

OTHER PUBLICATIONS

International Search Report and Written Opinion for PCT/IN2021/050137 mailed Apr. 23, 2021, all pages.

* cited by examiner

*Primary Examiner* — Huy Tram Nguyen
(74) *Attorney, Agent, or Firm* — Bradley Arant Boult Cummings LLP

(57) ABSTRACT

Bubble column reactor assemblies are provided, an assembly (100) comprising: a reactor vessel (102) comprising a bottom end and a top end. A pre-distributor plate (114) having a bottom surface and a top surface, disposed in the 5 reactor vessel (102) such that the bottom surface faces the bottom end of the reactor vessel (102). A gas distributor (106) is disposed below the pre-distributor plate (114) to receive and inject gas into a liquid prior to distribution of gas and liquid by the pre-distributor plate (114). The gas distributor (106) comprises: a common manifold (108) and a plurality of ring-shaped pipes disposed along a length of the 10 common manifold (108); and a plurality of nozzles disposed along an outer circumference of each ring-shaped (Continued)

pipe of the plurality of ring-shaped pipes to inject gas and create vortexes for uniform distribution of the gas in the liquid.

18 Claims, 3 Drawing Sheets

(51) Int. Cl.
    *B01J 8/08*     (2006.01)
    *B01J 8/18*     (2006.01)
    *B01J 8/22*     (2006.01)

(58) Field of Classification Search
    CPC . B01J 4/002; B01J 4/004; B01J 8/0015; B01J 8/085; B01J 8/14; B01J 10/002; B01J 8/226; B01J 19/00; C10G 47/26
    USPC .......................................................... 422/140
    See application file for complete search history.

GAS DISTRIBUTOR FOR BUBBLE COLUMN REACTOR

TECHNICAL FIELD

The present subject matter relates generally to a bubble column reactors, and in particular to a gas distributor for a three-phase bubble column reactor.

BACKGROUND

Depletion of light oil reserves has directed the focus of refiners towards the exploration of heavy and extra heavy crude oils. Heavy crude oils may be upgraded, for example, by hydroprocessing, for extracting value out of the heavy oils. Slurry hydrocracking is a hydrogen addition process where heavy oil is contacted with hydrogen gas in the presence of a suitable dual function catalyst that provides cracking and hydrogenation activity. Slurry reactors offer various advantages over fixed-bed reactors and ebullated bed reactors. Fixed bed reactors are limited in terms of their potential to process heavier feeds with high impurity levels. Ebullated bed reactors are more flexible with respect to the feedstock and can handle greater amounts of metals and coke but are limited by overall conversions. Slurry phase reactors are more reliable to achieve higher conversions and can handle feedstock that are typically difficult to process, for example, feedstocks with high impurity levels.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components where possible.

DETAILED DESCRIPTION

Figure 1:
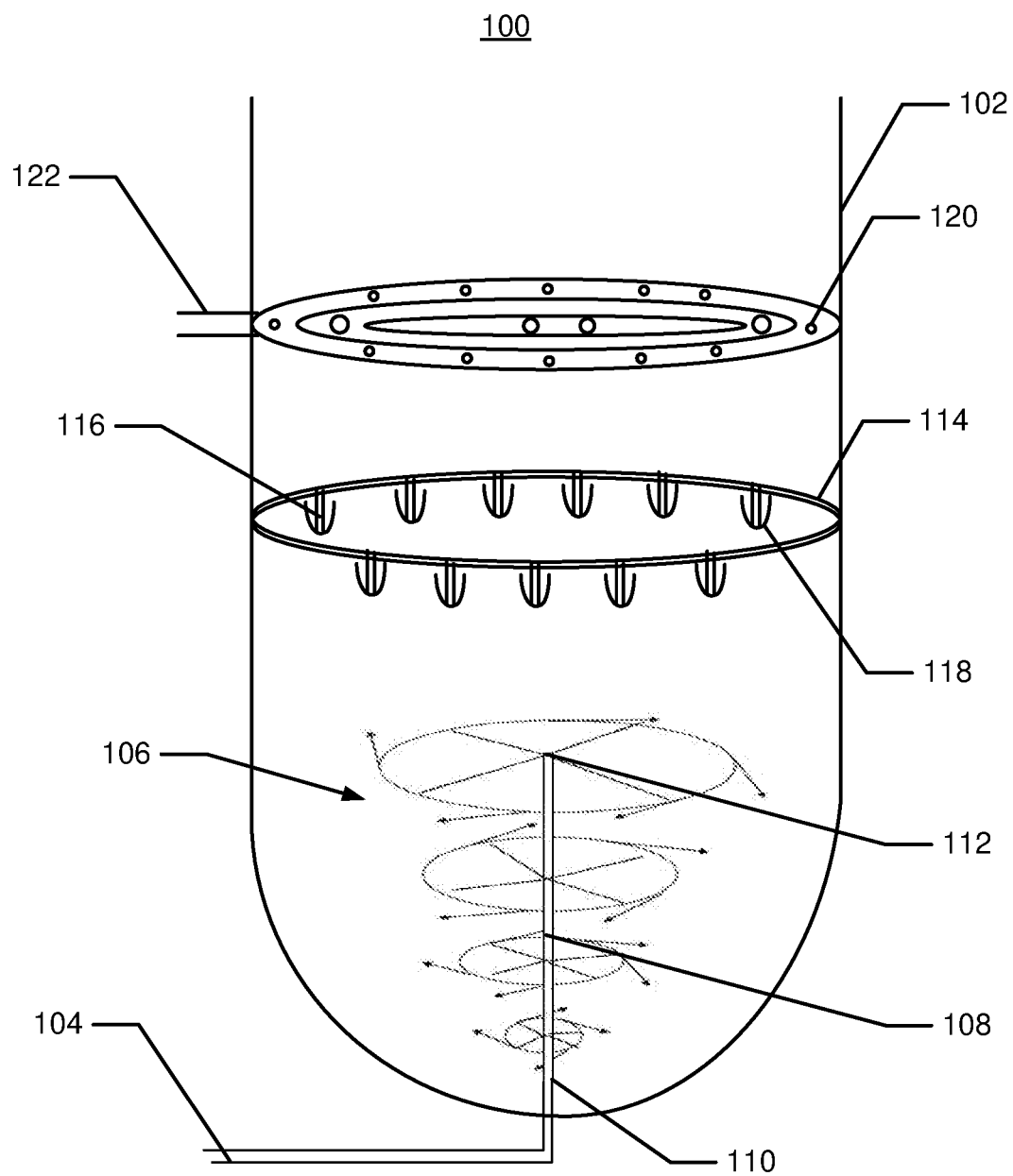
FIG. 1 illustrates an example bubble column reactor assembly with a gas distributor, in accordance with an embodiment of the present subject matter.

The present subject matter relates generally to bubble column reactors, and in particular to gas and liquid distributors for bubble column reactors. In an example, the present subject matter relates to three-phase slurry bubble column reactors.

Bubble column reactors are preferred for conducting slurry hydrocracking reactions owing to their excellent heat and mass transfer characteristics. The catalysts employed in slurry hydrocracking reactions are in nano form or in oil soluble form. This offers the flexibility of hydrocracking various kinds of feedstock. In such reactors, a gas is injected into a slurry which comprises catalyst solids suspended in a liquid. A gas distributor is used to inject the gas into the slurry. The gas distributor governs the bubble size distribution and rise velocities of the gas bubbles and is, thus, one of the most critical aspects of a bubble column reactor.

Slurry bubble column reactors are a preferred option for slurry phase hydrocracking of heavy oils. In such a reaction, the gaseous reactant, namely, hydrogen gas, is introduced into a slurry of catalyst dispersed in heavy hydrocarbon feedstock. The gas is introduced using a gas distributor.

The gas distributor design plays an important role in the hydrodynamics of the bubble column. For example, the size of the distributor holes determines the initial bubble size distribution inside the reactor. The initial bubble size distribution has an effect on the regime transition from the homogeneous to the heterogeneous phase. Hence, the design of the gas distributor has an impact on the performance of the bubble column reactors. Improper selection of type and design of the distributor may give rise to problems in terms of non-uniformity in the reactant distribution, creation of dead zones, and improper mixing of the reactants, which can adversely affect the conversion levels and product selectivity.

The present subject matter overcomes these and other problems and relates to a bubble column reactor assembly comprising a gas and liquid distributor. The bubble column reactor assembly is also referred to hereinafter as assembly. An example bubble column reactor assembly comprises a reactor vessel comprising a bottom end and a top end, and a pre-distributor plate for gas-liquid distribution.

The pre-distributor plate is disposed in the reactor vessel at a pre-determined height above the bottom end of the reactor vessel. The pre-distributor plate has a bottom surface and a top surface opposite to the bottom surface. The pre-distributor plate may be disposed in the reactor vessel such that the bottom surface faces the bottom end of the reactor vessel.

A gas distributor can be disposed below the pre-distributor plate to receive gas and for injecting gas into the liquid prior to distribution of gas and liquid by the pre-distributor plate. The gas may be, for example, hydrogen, and the liquid may be, for example, a slurry comprising catalysts suspended in a liquid feedstock.

In one example, the gas distributor comprises an arrangement of a plurality of ring-shaped pipes disposed along a length of a common manifold. The common manifold is to receive a gas for distributing in the liquid. One end of the common manifold may be connected to a gas inlet and other end of the common manifold may be closed and disposed at a height above the gas inlet.

The gas received by the common manifold is then received by the plurality of ring-shaped pipes to inject into the liquid. The diameter of the rings may be constant or may vary. Each ring-shaped pipe may be fluidly coupled to the common manifold by radial pipes. A plurality of nozzles can be disposed along an outer circumference of each of the ring-shaped pipe of the plurality of ring-shaped pipe to create vortexes for uniform distribution of gas in the liquid.

In operation, the gas may enter the common manifold from the gas inlet. The gas may then enter the plurality of ring-shaped pipes via the set of radial tubes connected to the common manifold. The gas exits the pipes via the plurality of nozzles along the outer circumference of the plurality of ring-shaped pipes. The gas may be discharged into the bubble column reactor assembly tangentially or at an angle to the pipe through the plurality of nozzles present on the outer circumference of the plurality of ring-shaped pipes. The gas exits at a high velocity and mixes with a liquid in the bubble column reactor assembly. The liquid may enter the bubble column reactor assembly via a liquid inlet disposed at the bottom end of the bubble column reactor assembly and may fill up the reactor volume. Thus, gas may be injected into the liquid as the liquid rises from the bottom end of the bubble column reactor assembly towards the pre-distributor plate.

In some examples, the pre-distributor plate comprises a plurality of perforations. Each perforation of the plurality of perforations comprises a duct and a cap. The duct can project from the bottom surface of the pre-distributor plate toward the bottom end of the reactor vessel. The cap may be inverted and be disposed on the bottom surface of the pre-distributor plate and can enclose the duct and perforation. The cap may have a plurality of openings to allow a liquid and gas mixture to enter the cap and the liquid and gas mixture can move up the reactor vessel via the plurality of perforations in the pre-distributor plate. Presence of the cap helps in better size distribution of gas as it helps break large gas bubbles into smaller size bubbles and helps in better mixing of gas in the liquid.

The gas distributor of the present subject matter allows for uniform distribution of gas in the bubble column reactor assembly. The direction of efflux of the gas stream from the ring-shaped pipes may be alternate across different pipes, depending on the nozzle direction. For example, a first ring-shaped pipe may discharge the gas stream in a clockwise direction while the second ring-shaped pipe placed next to the first ring-shaped pipe may discharge the gas stream in an anti-clockwise manner. The change in direction of efflux provides enhanced mixing due to vortex creation, thus, improving heat and mass transfer between gas and liquid in the presence of solids. This allows for enhanced gas distribution in the liquid, eliminates dead zones, and allows efficient mixing of any settled nano-catalyst that may be present in the liquid. The manner in which gas is discharged from the plurality of ring-shaped pipes can also eliminate the attrition of solids which is otherwise evident with a conventional design in which the jet streams are required to be discharged at a very high velocity to effect better mixing, which can ultimately lead to attrition of catalytic particles.

Compared to gas distributors that include a single pipe formed as helix or other shapes, the gas distributor of the present subject matter is not affected by the velocities of the gases inside the pipe that otherwise tend to create vibrations, instability of the connected tubing, and other operational issues. The disconnected rings of different diameters connected to the common manifold of the present subject matter will not only eliminate any vibrational issues, but also provides the flexibility to change or maintain the required velocities at the nozzles.

The presence of the pre-distributor plate helps to disperse gas uniformly inside the bubble column reactor assembly by breaking big gas bubbles into smaller bubbles allowing for greater reaction efficiency. The pre-distributor mixes the gas and the liquid reactants resulting in optimal dissolution of gas in the liquid phase for higher yield and also maintains good recirculation and near isothermal conditions in the bubble column reactor assembly. In case inverted caps are provided in the pre-distributor an enhanced mixing between the gas and liquid phase may be achieved and it may give rise to high mass transfer rates because of diffusion and convection. This provides better distribution of gas and liquid before entering the main reaction portion of the bubble column reactor assembly. The momentum is transferred from gas phase to liquid phase and allows an efficient mixing of any settled nano-sized catalyst.

Aspects of the present subject matter are further described in conjunction with the appended figures. It should be noted that the description and figures merely illustrate the principles of the present subject matter. It will thus be appreciated that various arrangements that embody the principles of the present subject matter, although not explicitly described or shown herein, can be devised from the description and are included within its scope. Moreover, all statements herein reciting principles, aspects, and implementations of the present subject matter, as well as specific examples thereof, are intended to encompass equivalents thereof.

FIG. 1 illustrates an example bubble column reactor assembly 100 with a gas distributor, in accordance with an embodiment of the present subject matter. The bubble column reactor assembly 100, also referred to as an assembly 100, comprises a reactor vessel 102, a gas distributor 106, and a pre-distributor plate 114.

The reactor vessel 102 may be cylindrical in shape. The reactor vessel 102 may comprise a bottom end and a top end. In one example, the bottom end and the top end may be hemispherical or conical in shape. A diameter of the reactor vessel 102 may be in a range of 15 cm to 5 m. In one example, a Height over Diameter Ratio (H/D) of the reactor vessel 102 is in the range of 2 to 20. As will be understood, the diameter and the height of the reactor vessel 102 may be varied based on the application of the reactor vessel 102.

The gas distributor 106 is for gas-liquid distribution and may be disposed towards the bottom end of the reactor vessel 102. In one example, the gas distributor 106 is disposed below the pre-distributor plate 114. The gas distributor 106 is to receive gas for injecting gas into a liquid prior to distribution of gas and liquid by the pre-distributor plate 114.

The gas distributor 106 comprises a common manifold 108. The common manifold 108 of the gas distributor 106 can be fluidically connected to a gas inlet 104 at a first end 110 of the common manifold 108 to receive the gas. A second end 112 of the common manifold 108 may be closed. The second end 112 may be disposed at a height above the first end 110 and at a height above the gas inlet 104. In one example, a distance of the second end 112 from the bottom end of the reactor vessel 102 is in a range of 0.5 to 2 times of a diameter of reactor vessel 102.

The gas distributor 106 also comprises a plurality of ring-shaped pipes disposed along a height of the common manifold 108. Each of the plurality of ring-shaped pipes receives the gas from the common manifold 108. In one example, the gas distributor 106 comprises radial pipes to fluidly couple the plurality of ring-shaped pipes with the common manifold 108. During operation, the gas, such as hydrogen, may enter the common manifold 108 from the gas inlet 104 and then enter the plurality of ring-shaped pipes via the radial tubes connected to the common manifold 108.

For injecting of the gas into the liquid, the gas distributor 106 can comprise a plurality of nozzles disposed along an outer circumference of each ring-shaped pipe of the plurality of ring-shaped pipes. Gas may exit the ring-shaped pipes via the plurality of nozzles and cause vortex formation in the liquid for improved mixing. The liquid may rise from the bottom end of the reactor vessel 102 towards the pre-distributor plate 114.

The assembly 100 comprises the pre-distributor plate 114 disposed in the reactor vessel 102 at a pre-determined height above the bottom end of the reactor vessel 102. In an example the pre-distributor plate 114 may be disposed at a height from the bottom end of the reactor vessel 102 in the range of 0.5 to 3 times the diameter of the reactor vessel 102. In an example, the pre-distributor plate 114 may be concentric to the reactor vessel 102.

The pre-distributor plate 114 may be a plate comprising a bottom surface and a top surface opposite to the bottom surface. The pre-distributor plate 114 may be disposed in the reactor vessel 102 such that the bottom surface faces the bottom end of the reactor vessel 102.

The pre-distributor plate 114 comprises a plurality of perforations. The perforations may extend from the top surface to the bottom surface of the pre-distributor plate 114. A diameter of each perforation of the plurality of perforation may be based on a pre-determined superficial gas velocity. The superficial gas velocity may be in a range of 1 cm/s to 40 m/s. The plurality of perforations may be arranged in any of a triangular pitch, a square pitch, or a circular pitch. A pitch to plate perforation diameter ratio may be in a range 1 to 15.

A duct 116 may project from each perforation of the plurality of perforation in a direction towards the bottom end of the reactor vessel 102. Each perforation and duct 116 may be enclosed by a cap 118 disposed on the bottom surface of the pre-distributor plate 114. In an example, the cap 118 may be welded to the pre-distributor plate 114. The cap 118 comprises a base disposed on the bottom surface of the pre-distributor plate 114 and an apex away from the bottom surface of the pre-distributor plate 114. In one example, a minimum base diameter of the cap 118 is equivalent to 1.1 times a diameter of a perforation and a maximum base diameter of the cap 118 is equivalent to 0.5 times a pitch of the perforations. In one example, a length of the duct 116 may be in a range of 30-90% of a height of the cap 118 from the base to the apex.

The cap 118 may be of any curved shape and disposed so that it encloses the perforation and the duct 116. In one example, the cap 118 may have a plurality of openings (not shown in this figure) disposed around a surface of the cap 118. A diameter of the openings in the cap 118 may be based on a superficial gas velocity which may lie in the range of 1 cm/s to 40 m/s.

In one example, the pre-distributor plate 114 may be disposed in the reactor vessel 102 at a certain height above the second end 112 of the common manifold 108 of the gas distributor 106. In an example the pre-distributor plate 114 may be disposed at a height in the range of 0.5 to 3 times a diameter of the reactor vessel 102 from the bottom end of the reactor vessel 102. In an example, the pre-distributor plate 114 may be concentric to the reactor vessel 102.

During operation, gas may be distributed in the reactor vessel 102 after entering the reactor vessel 102 using the gas distributor 106 before the gas-liquid mixture passes through the pre-distributor plate 114. As the gas-liquid mixture rises up the reactor vessel 102 over the gas distributor 106, the mixture may enter the cap 118 via the openings, enter the duct 116, and may be discharged above the pre-distributor plate 114 from the perforations. The presence and the shape of cap 118 allows greater mixing of gas and liquid and significantly reduces the number of dead zones in the vicinity of the pre-distributor plate 114. In addition, large gas bubbles are broken down into smaller bubbles, allowing for greater reaction efficiency and higher conversion.

In one example, a secondary gas distributor 120 may be disposed above the pre-distributor plate 114 at a certain height above the pre-distributor plate 114. The minimum height at which the secondary gas distributor 120 may be disposed in the reactor vessel 102 is equivalent to a diameter of reactor vessel 102, from the surface of the pre-distributor plate 114. The maximum height at which the secondary gas distributor 120 is disposed in the reactor vessel 102 is equivalent to 75% of the height of reactor vessel 102. In one example, more than one secondary gas distributor 120 may be provided.

In an example, the secondary gas distributor 120 may be a concentric ring sparger. In other examples, the secondary gas distributor 120 may be any other gas distributor known in the art. In an example, the assembly 100 may comprise a second gas inlet 122 fluidically connected to the secondary gas distributor 120. The second gas inlet 122 allows for additional gas to be fed to the reactor vessel 102. The secondary gas distributor 120 may disperse gas into the reactor vessel 102 in the form of bubbles to maintain the operation of the reaction in bubble flow regimes.

Figure 2:
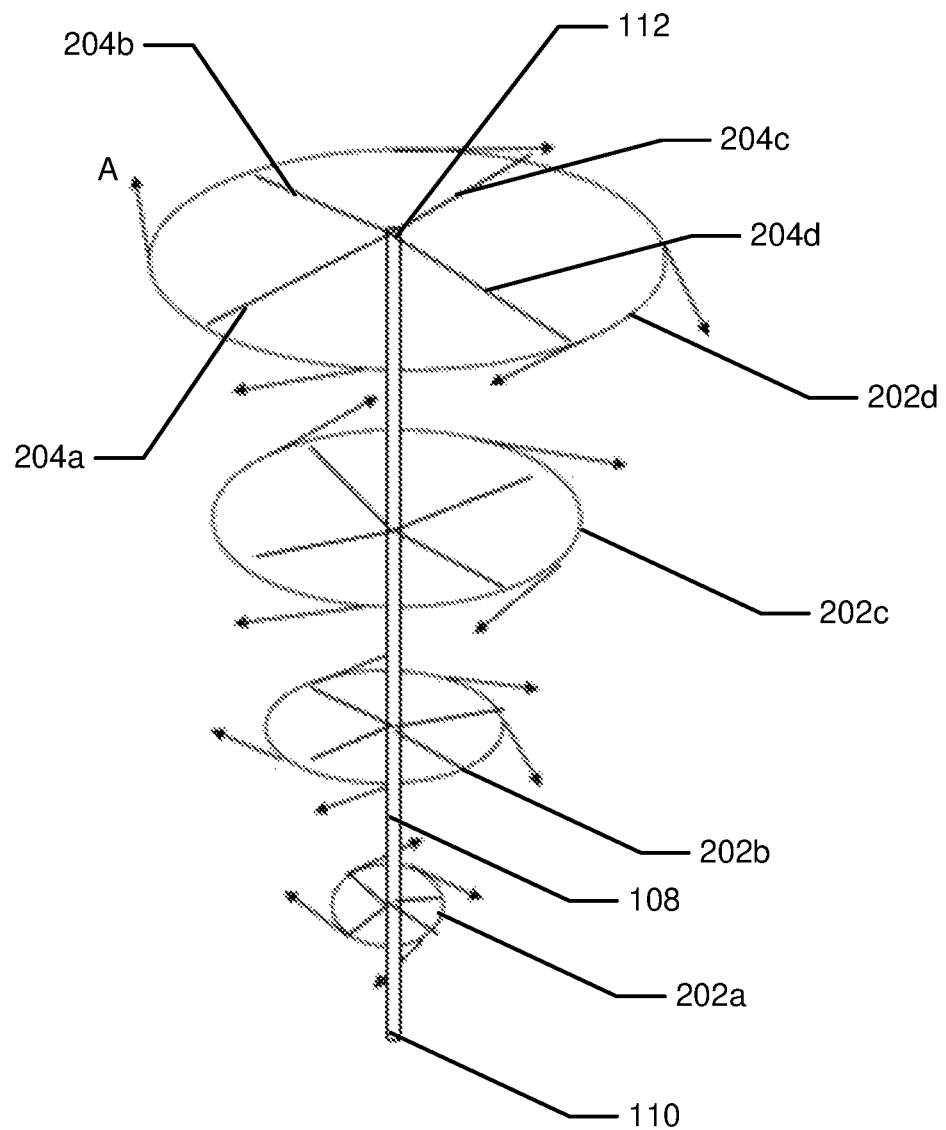
FIG. 2 illustrates an example gas distributor, in accordance with an embodiment of the present subject matter.

FIG. 2 illustrates an example gas distributor, in accordance with an embodiment of the present subject matter. The gas distributor 106 may include an arrangement of pipes 202a-202d, also referred to as pipes 202, connected to the common manifold 108. Each of the pipes 202 may be ring shaped. The diameter of the common manifold 108 is such that the velocity of the gases in the common manifold 108 is in the range of 1 cm/s to 5 m/s.

In an example, the pipes 202 are arranged along the length of the common manifold 108 one above the other at a distance from each other. Each ring-shaped pipe of the plurality of ring-shaped pipes may have equal inner diameter. In another example, the plurality of ring-shaped pipes has varied inner diameters. In an example, inner diameter of the plurality of ring-shaped pipes ratios in a range of 0.1 to 1.0. For example, the pipes 202 may be rings stacked one over the other separated by a distance. The inner diameter of rings in the stack may vary from top of the stack to bottom of the stack. In one example, if the inner diameter of the rings is equal then the ratio of diameters between one ring to the other ring is 1. In another example, if the inner diameter of a ring is ⅒th of that of the ring above, then the ratio of diameter of one ring to the other ring is 0.1. Similarly, the ratio of diameter of one ring to the next ring in the stack may vary in the range of 0.1 to 1. The distance between two consecutive rings may be equal to the diameter of the bigger ring or may vary up to ⅒th of the diameter of the bigger ring. In one example, the rings may be placed equidistant to each other. In one example, the ratio of diameter of the ring to the diameter of the reactor vessel 102 may vary between 0.95 to 0.05 over the stack of rings.

In one example, the diameter of the ring increases from the bottom most pipe 202a, which is proximal to the gas inlet 104, to the top most pipe 202d, which is proximal to the second end 112 of the common manifold 108. In another example, the pipes 202 may be stacked with bigger ring proximal to the gas inlet 104 and smaller ring proximal to the second end 112 of the common manifold 108. In yet another example, the rings may be stacked in another order of varying diameters.

Each pipe 202 may be connected to the common manifold 108 via a set of radial tubes 204. For example, as shown in the figure, the pipe 202d may be connected to the common manifold 108 via radial tubes 204a-204d. The pipes 202a-d may comprise a plurality of nozzles along the outer circumference of the pipes 202 to allow exit of gas for mixing the gas with surrounding liquid in the reactor vessel 102. As will be understood, thickness and material of construction of the common manifold and radial tubes pipe will depend on their stability and reliability to the type of fluids employed and the velocity of gases stated.

During operation of the reactor assembly 100, the gas stream may enter the common manifold 108 from the gas inlet 104, then enter the pipes 202 via the respective set of radial tubes 204. Gas stream exits the pipes 202 via the plurality of nozzles placed along the outer circumference of the pipes 202. A size of each nozzle of the plurality of nozzles is based on a pre-determined velocity of discharge gas. In one example, the velocity of discharge gas is in a range of 2 cm/s to 50 m/s. Arrows marked on the circumference of the pipes 202 show the direction of ejection of gas from the plurality of nozzle along the outer circumference of the pipes 202 in accordance to one example implementation. For example, the gas stream received into the pipes 202 may be discharged into the reactor tangentially to the pipes or at some other angle to the pipes. In one example, the pipes 202 may discharge the gas stream in a clockwise direction A as shown in the figure. In another example, the pipes 202 may discharge the gas stream in an anti-clockwise direction (not shown in figure). In another example, the gas stream may be discharged from alternate pipes in the same direction and opposite to the direction in which the gas stream is discharged from the other pipes. For example, a first pipe 202*a* and a third pipe 202*c* may discharge the gas stream in a clockwise manner and a second pipe 202*b* and a fourth pipe 202*d* may discharge the gas stream in an anti-clockwise manner, depending on nozzle direction. In some examples, the nozzle may also be inclined upwards or downwards to the tangential direction for angular discharge of the gas.

As the gas is discharged from the gas distributor 106, tangentially or at an angle to the pipes 202, it creates a vortex for enhanced mixing with the surrounding liquid. Liquid may enter the reactor vessel 102 via a liquid inlet (not shown in figure) at a bottom of the reactor and fill the volume of the reactor vessel 102. Hence, the gas exiting from the gas distributor 106 mixes with the liquid on exit from the pipes 202. The gas distributor 106 is thus used for pre-mixing of the gas and liquid reactants for greater reaction efficiency. The configuration of gas distributor 106 helps in providing a swirling motion to the gas and liquid, which increases turbulence, increases mixing of any nano-catalyst present in the gas-liquid slurry, and eliminates dead zones in the reactor. The configuration of the gas distributor 106 comprising of disconnected rings of different diameters connected to the common manifold 108 helps in eliminating any vibrational issues and provides the flexibility to change or maintain the required velocities at the nozzles.

In one example, further mixing may be achieved as the gas-liquid mixture passes through the pre-distributor plate 114.

Figure 3:
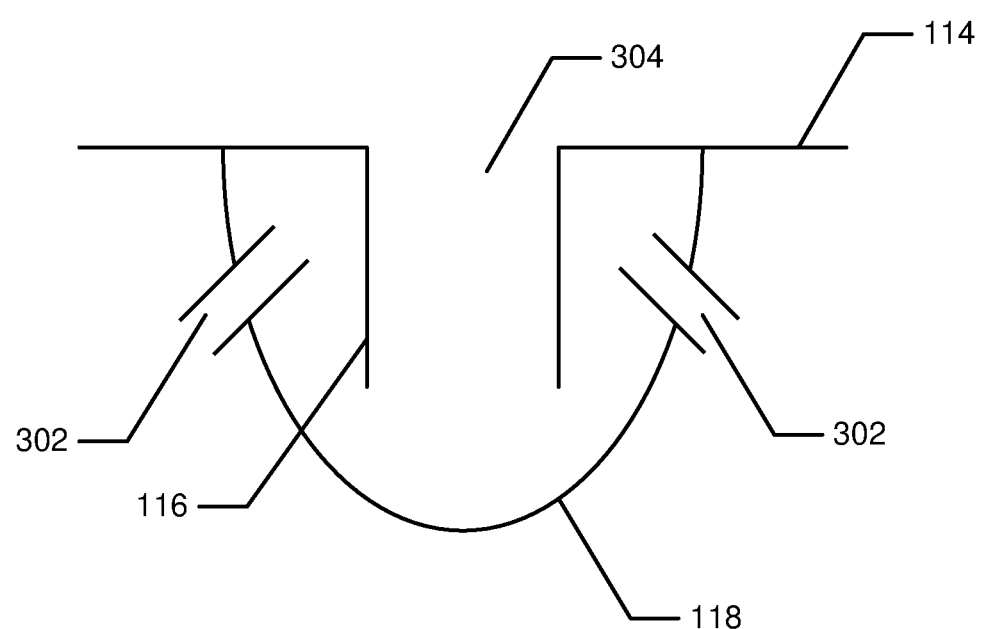
FIG. 3 illustrates an example cap for a pre-distributor plate, in accordance with an embodiment of the present subject matter.

FIG. 3 illustrates an example cap for a pre-distributor plate, in accordance with an embodiment of the present subject matter. The cap 118 may have a curved shape. In various examples the cap 118 may be dome-shaped, conical with a curved top part, or any other shape that has no sharp points or corners. The cap 118 may be attached to the pre-distributor plate 114 using any method known in the art, for example, by welding or using an adhesive. The cap 118 is inverted and is disposed on a bottom surface of the pre-distributor plate 114, the bottom surface being the surface facing the bottom of the reactor vessel 102. The presence of the cap 118 allows greater mixing of liquid and gas significantly reduces any dead zones in the assembly 100. The cap 118 may be disposed so that it encloses the duct 116 projecting from a perforation 304 in the pre-distributor plate 114.

The cap 118 may have cap orifices such as one or more openings 302, also referred to as openings 302, to allow the gas-liquid mixture to enter the cap 118. In an example, there may be more than one opening 302. In another example, there may be two openings 302 so that they are 180° apart on a circumference of the cap 118. In another example, there may be four openings so that they are 90° apart on the circumference of the cap 118. In yet another example, there may be several openings 302. The number of opening 302 may be optimized based on the desired pressure drop of the gas-liquid mixture and the size of the cap 118. In an example, the opening 302 may be disposed at portions proximal to a portion of the cap 118 attached to the pre-distributor plate 114. In another example, the openings 302 may be disposed at different heights from the pre-distributor plate 114.

In operation, the gas-liquid mixture may enter the cap 118 via the openings 302, then enter the duct 116, and exit the pre-distributor plate 114 via the perforations. The cap 118 causes large gas bubbles to break into smaller bubbles as they pass through the openings 302, allowing for greater reaction efficiency and higher conversion. In addition, there are no dead zones around the cap 118 due to the slope on the side of the cap and further mixing may occur as the gas-liquid mixture rise through the duct 116.

Although embodiments of the present subject matter are described in language specific to structural features, it is to be understood that the specific features and methods are disclosed as example embodiments for implementing the claimed subject matter.

We claim:

1. A bubble column reactor assembly (100) comprising:
a reactor vessel (102) comprising a bottom end and a top end;
a pre-distributor plate (114) for gas-liquid distribution, the pre-distributor plate (114) disposed in the reactor vessel (102) at a pre-determined height above the bottom end of the reactor vessel (102), wherein the pre-distributor plate (114) has a bottom surface and a top surface opposite to the bottom surface, wherein the bottom surface faces the bottom end of the reactor vessel (102); and
a gas distributor (106) disposed below the pre-distributor plate (114) to receive gas for injecting gas into a liquid prior to distribution of gas and liquid by the pre-distributor plate (114), wherein the gas distributor (106) comprises:
a common manifold (108) to receive the gas for distributing in the liquid;
a plurality of ring-shaped pipes (202*a*, 202*b*, 202*c*, 202*d*) disposed along a length of the common manifold (108), wherein each of the plurality of ring-shaped pipes (202*a*, 202*b*, 202*c*, 202*d*) receive the gas from the common manifold (108); and
a plurality of nozzles disposed along an outer circumference of each ring-shaped pipe of the plurality of ring-shaped pipes (202*a*, 202*b*, 202*c*, 202*d*) to inject gas into the reactor vessel and create vortexes for uniform distribution of gas in the liquid.

2. The bubble column reactor assembly (100) as claimed in claim 1 comprising radial pipes (204*a*, 204*b*, 204*c*, 204*d*) to fluidly couple the plurality of ring-shaped pipes (202*a*, 202*b*, 202*c*, 202*d*) with the common manifold (108).

3. The bubble column reactor assembly (100) as claimed in claim 1, wherein the pre-distributor plate (114) comprises:
a plurality of perforations (304), wherein each perforation of the plurality of perforations (304) comprises:
a duct (116) projecting from the bottom surface of the pre-distributor plate (114) towards the bottom end of the reactor vessel (102); and
a cap (118) disposed on the bottom surface of the pre-distributor plate (114) enclosing the duct (116) and the perforation (304), wherein the cap (118) comprises a plurality of openings (302) disposed around a surface of the cap (118).

4. The bubble column reactor assembly (100) as claimed in claim 1, wherein a diameter of the reactor vessel (102) is in the range of 15 cm to 5 m.

5. The bubble column reactor assembly (100) as claimed in claim 1, wherein a Height over Diameter Ratio (H/D) of the reactor vessel (102) is in the range of 2 to 20.

6. The bubble column reactor assembly (100) as claimed in claim 1, wherein the common manifold (108) comprises:
 a first end (110) coupled to a gas inlet (104) to receive the gas; and
 a second end (112) disposed at a height above the first end (110), wherein a distance of the second end (112) from the bottom end of the reactor vessel (102) is in a range of 0.5 to 2 times of a diameter of reactor vessel (104).

7. The bubble column reactor assembly (100) as claimed in claim 1, wherein each ring-shaped pipe of the plurality of ring-shaped pipes (202a, 202b, 202c, 202d) has equal inner diameter.

8. The bubble column reactor assembly (100) as claimed in claim 1, wherein the plurality of ring-shaped pipes (202a, 202b, 202c, 202d) has varied inner diameters.

9. The bubble column reactor assembly (100) as claimed in claim 8, wherein inner diameter of the plurality of ring-shaped pipes (202a, 202b, 202c, 202d) ratios are in a range of 0.1 to 1.0.

10. The bubble column reactor assembly (100) as claimed in claim 1, wherein a ratio of diameter of the plurality of ring-shaped pipes (202a, 202b, 202c, 202d) to a diameter of the reactor vessel (102) is in a range of 0.05 to 0.95.

11. The bubble column reactor assembly (100) as claimed in claim 1, wherein a size of each nozzle of the plurality of nozzles is based on a pre-determined velocity of discharge gas, wherein the velocity of discharge gas is in a range of 2 cm/s to 50 m/s.

12. The bubble column reactor assembly (100) as claimed in claim 3, wherein a diameter of each perforation of the plurality of perforations is based on a pre-determined superficial gas velocity, wherein the superficial gas velocity is in a range of 1 cm/s to 40 m/s.

13. The bubble column reactor assembly (100) as claimed in claim 3, wherein the plurality of perforations is arranged in any of a triangular pitch, a square pitch, or a circular pitch.

14. The bubble column reactor assembly (100) as claimed in claim 3, wherein a pitch to perforation diameter ratio lies in a range of 1 to 15.

15. The bubble column reactor assembly (100) as claimed in claim 3, wherein the cap (118) comprises a base disposed on the bottom surface of the pre-distributor plate (114), wherein a minimum base diameter of the cap is equivalent to 1.1 times a diameter of the perforation.

16. The bubble column reactor assembly (100) as claimed in claim 3, wherein a maximum base diameter of the cap (118) is equivalent to 0.5 times a pitch of the perforations.

17. The bubble column reactor assembly (100) as claimed in claim 3, wherein a length of the duct (116) is in a range of 30% to 90% of a height of the cap (118) from the bottom surface of the pre-distributor plate (114).

18. The bubble column reactor assembly (100) as claimed in claim 3, wherein a diameter of the openings (302) is based on a superficial gas velocity, wherein the superficial gas velocity is in a range of 1 cm/s to 40 m/s.

* * * * *